(12) United States Patent
DeWeerdt et al.

(10) Patent No.: US 8,938,666 B2
(45) Date of Patent: Jan. 20, 2015

(54) SUPPORT SELECTIVE GRAPHICAL DISPLAY OF SYSTEM CONFIGURATIONS USING VIEW FILTERS

(75) Inventors: Ronald Harold DeWeerdt, Rochester, MN (US); William R. Dorow, Jr., Rochester, MN (US); Cheranellore Vasudevan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1896 days.

(21) Appl. No.: 11/940,128

(22) Filed: Nov. 14, 2007

(65) Prior Publication Data
US 2009/0125808 A1 May 14, 2009

(51) Int. Cl.
*G06F 17/00* (2006.01)
*G06F 17/50* (2006.01)

(52) U.S. Cl.
CPC .......... *G06F 17/509* (2013.01); *G06F 2217/02* (2013.01); *Y10S 715/964* (2013.01)
USPC ......................................... 715/200; 715/964

(58) Field of Classification Search
CPC ...................................................... H04L 1/006
USPC ........................... 715/273, 200, 964, 852, 771
See application file for complete search history.

(56) References Cited

U.S. PATENT DOCUMENTS

| | | | | |
|---|---|---|---|---|
| 5,212,771 | A * | 5/1993 | Gane et al. | 715/854 |
| 5,305,437 | A * | 4/1994 | Fritze et al. | 345/520 |
| 5,515,524 | A * | 5/1996 | Lynch et al. | 703/13 |
| 5,984,503 | A | 11/1999 | Strickland et al. | |
| 6,058,259 | A | 5/2000 | Murakami | |
| 6,725,184 | B1 | 4/2004 | Gadh et al. | |
| 7,062,718 | B2 * | 6/2006 | Kodosky et al. | 715/771 |
| 7,170,509 | B2 | 1/2007 | Tanaka et al. | |
| 7,831,914 | B2 * | 11/2010 | Kodosky et al. | 715/735 |
| 8,578,262 | B2 * | 11/2013 | Averitt et al. | 715/221 |
| 2005/0010877 | A1 | 1/2005 | Udler | |
| 2007/0070073 | A1 | 3/2007 | Davis et al. | |

FOREIGN PATENT DOCUMENTS

| | | |
|---|---|---|
| EP | 0654745 A2 | 5/1995 |
| JP | 02178775 | 7/1990 |
| JP | 200584773 | 3/2005 |

OTHER PUBLICATIONS

Johnson, "Topdraw Topology Editor", IBM Technical Disclosure Bulletin, Aug. 1989, pp. 72-75.

* cited by examiner

*Primary Examiner* — Manglesh M Patel
(74) *Attorney, Agent, or Firm* — Steven L. Bennett; Yee & Associates, P.C.

(57) ABSTRACT

A user enters a selection of system components to be included within a configurable system. An initial top-level system diagram is then generated and displayed to the user. The user can then input a designation specifying one or more logical groups, functional groups, or other specified system components that the user wishes to display as a filtered system diagram. Other system components are examined to determine which, if any, of the system components have attributes matching the designation. A filtered system diagram is then generated highlighting the included system components having attributes matching the designation. Alternatively, the filtered system diagram can exclude those system components not having attributes matching the designation.

18 Claims, 14 Drawing Sheets

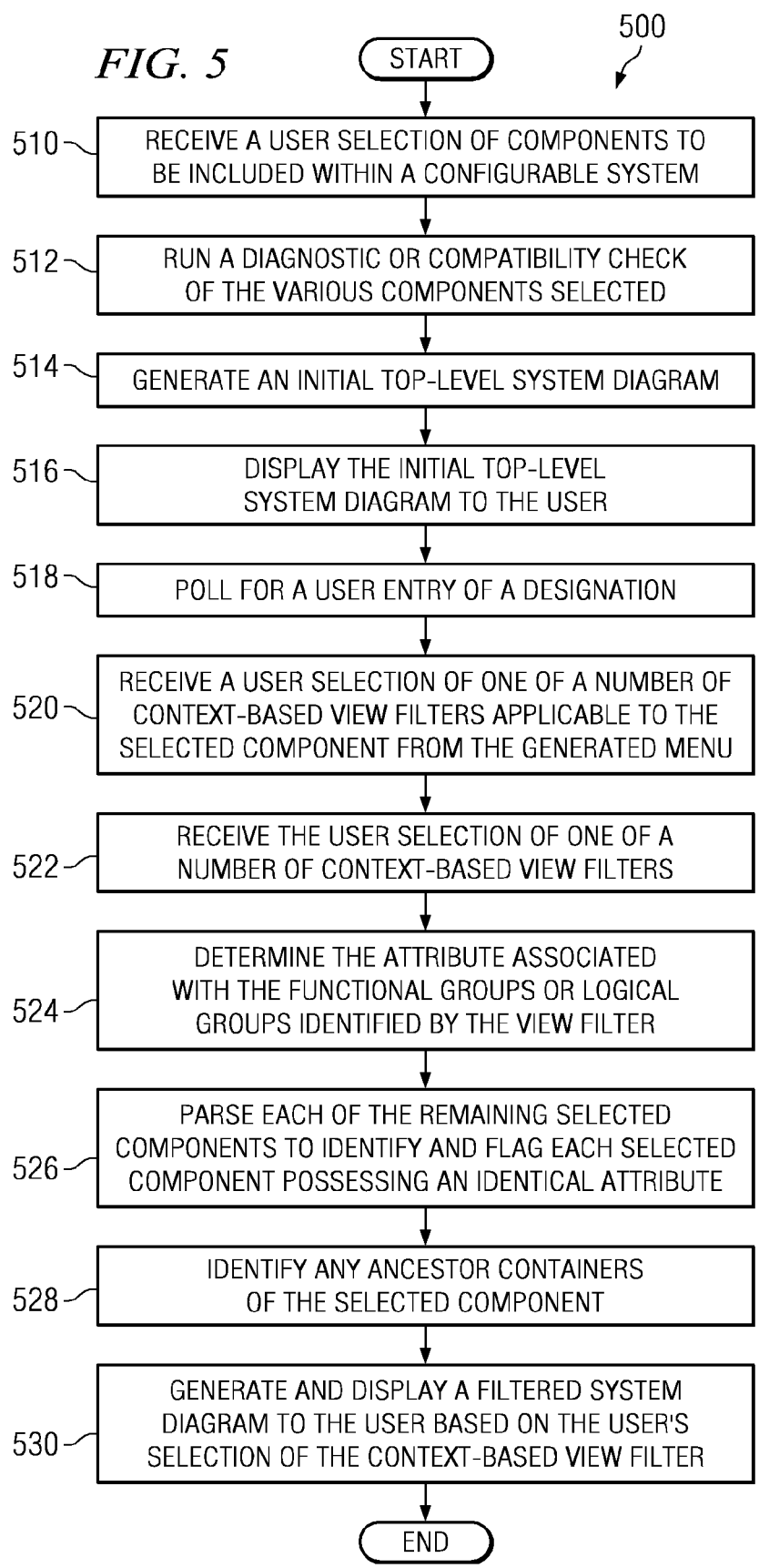

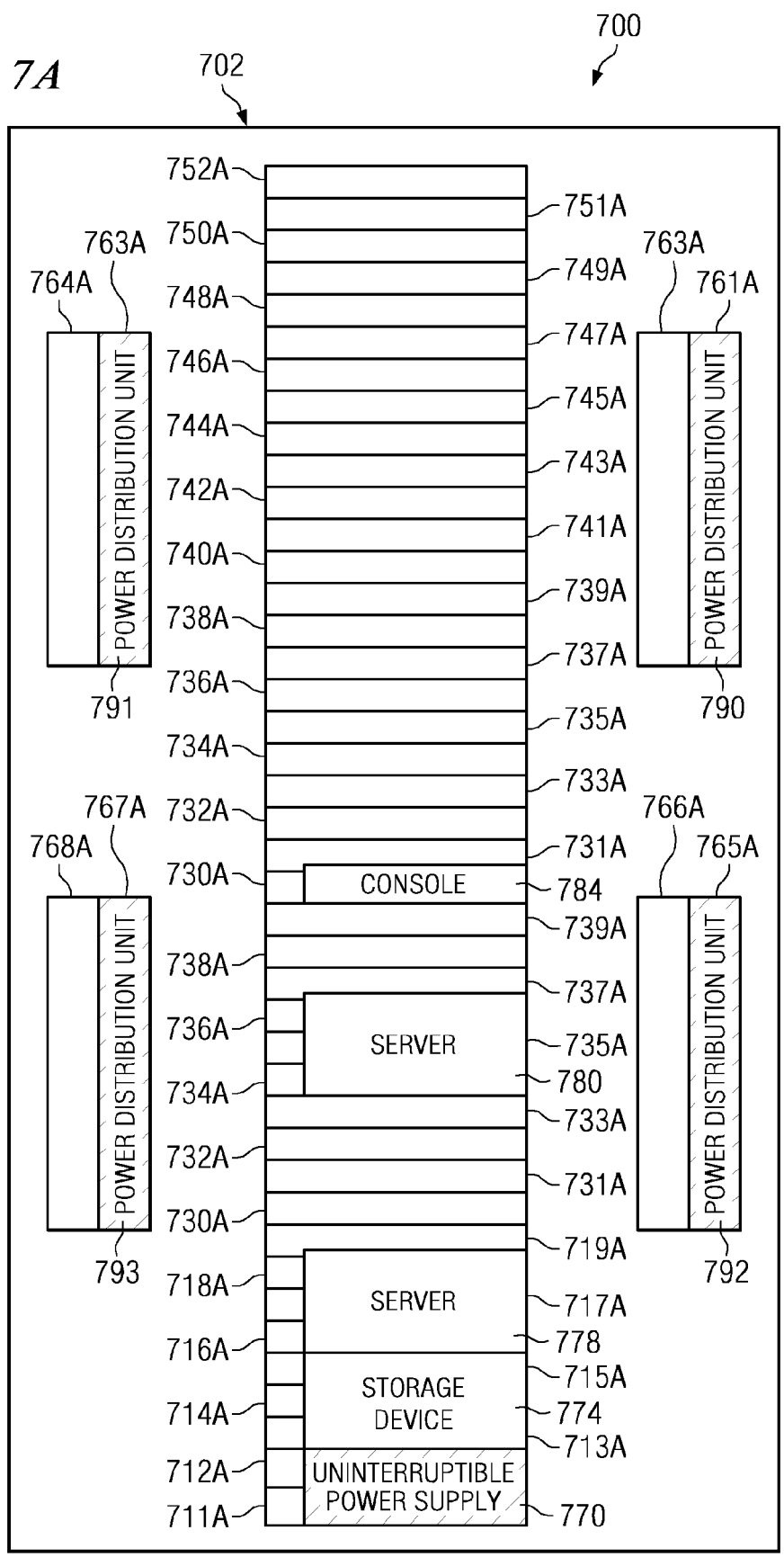

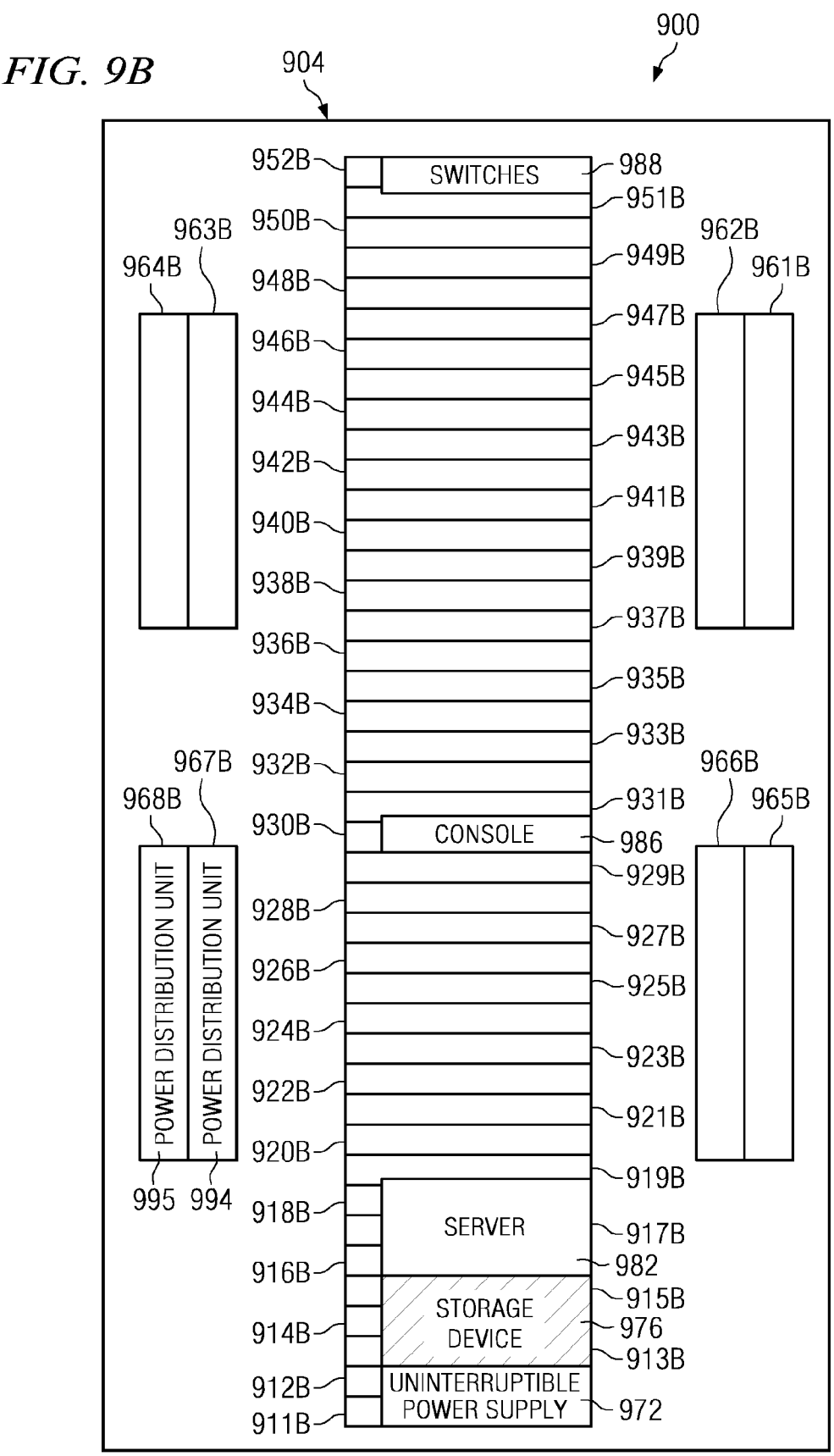

SUPPORT SELECTIVE GRAPHICAL DISPLAY OF SYSTEM CONFIGURATIONS USING VIEW FILTERS

BACKGROUND OF THE INVENTION

1. Field of the Invention

The present invention relates generally to systems, methods and computer code products for a data processing system. More specifically, the present invention relates generally to systems, methods and computer code products for the filtered display of a system diagram within a data processing system.

2. Description of the Related Art

System diagrams provide a graphical display of the configuration of components within a system. The system diagram may show the physical location, as well as the interconnectivity of each component. This can include the relative locations of different modules and/or parts to provide not only an approximated view of the physical system, but also to provide configuration information to the manufacturing and installation personnel. By maintaining this high level view of connectivity and physical placement, system diagrams also aide engineers and personnel with the placement of new components within the system.

Typical system diagrams provide functionality to observe the system at various viewing angles, for example, a top view, rear view, front view, and side views. While these various views provide manufacturing and installation personnel with a large amount of information for the location and interconnectivity of each component, such a vast amount of unfiltered information can be overwhelmingly confusing.

BRIEF SUMMARY OF THE INVENTION

A user enters a selection of system components to be included within a configurable system. An initial top-level system diagram is then generated and displayed to the user. The user can then input a designation specifying one or more logical groups, functional groups, or other specified system components that the user wishes to display as a filtered system diagram. Other system components are examined to determine which, if any, of the system components have attributes matching the designation. A filtered system diagram is then generated highlighting the included system components having attributes matching the designation. Alternatively, the filtered system diagram can exclude those system components not having attributes matching the designation.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a more detailed flowchart for a process of configuring a data processing system and displaying a filtered system diagram thereof in which illustrative embodiments may be implemented;

FIGS. 7A and 7B is the system diagram of FIG. 6 shown displaying highlighted power subsystem components in which illustrative embodiments may be implemented;

FIGS. 9A and 9B is the system diagram of FIG. 6 shown displaying highlighted storage subsystem components in which illustrative embodiments may be implemented.

DETAILED DESCRIPTION OF THE INVENTION

Figure 1:
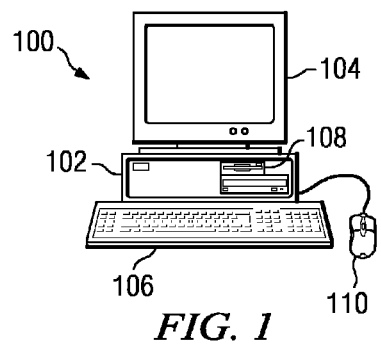
FIG. 1 is a pictorial representation of a data processing system in which illustrative embodiments may be implemented.

With reference now to the figures and in particular with reference to FIG. 1, a pictorial representation of a data processing system is shown in which illustrative embodiments may be implemented.

Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices could include, for example, a joystick, a touchpad, a touch screen, a trackball, and a microphone.

Computer 100 may be any suitable computer, such as an IBM® eServer™ computer or an IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
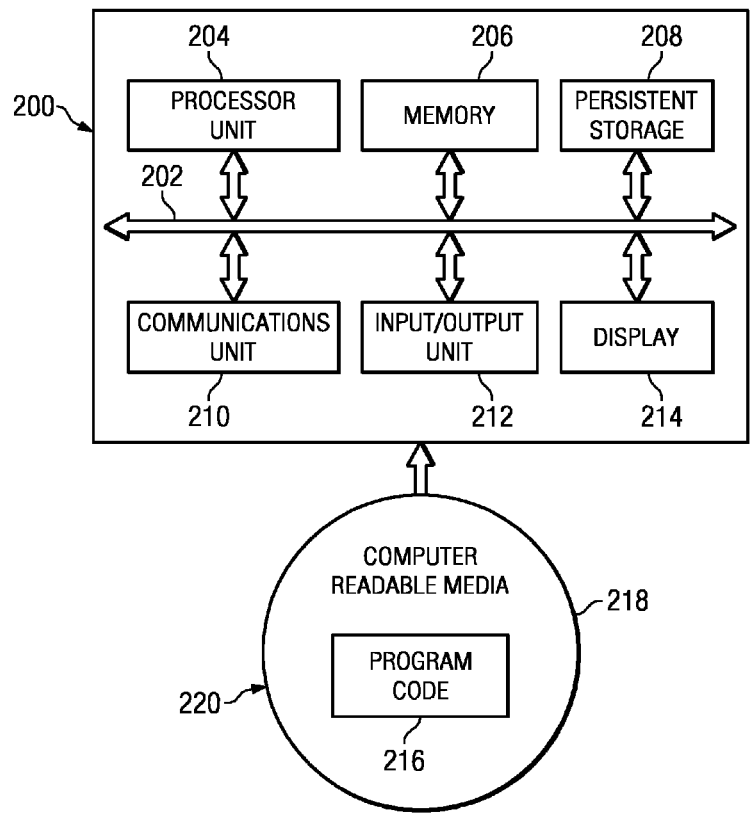
FIG. 2 is a block diagram of a data processing system in which illustrative embodiments may be implemented.

Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including an interface and memory controller hub (interface/MCH) 202 and an interface and input/output (I/O) controller hub (interface/ICH) 204. Processing unit 206, main memory 208, and graphics processor 210 are coupled to interface and memory controller hub 202. Processing unit 206 may contain one or more processors and even may be implemented using one or more heterogeneous processor systems. Graphics processor 210 may be coupled to interface and memory controller hub 202 through an accelerated graphics port (AGP), for example.

In the depicted example, local area network (LAN) adapter 212 is coupled to interface and I/O controller hub 204, audio adapter 216, keyboard and mouse adapter 220, modem 222, read only memory (ROM) 224, universal serial bus (USB) and other ports 232. PCI/PCIe devices 234 are coupled to interface and I/O controller hub 204 through bus 238. Hard disk drive (HDD) 226 and CD-ROM 230 are coupled to interface and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to interface and I/O controller hub 204.

An operating system runs on processing unit 206. This operating system coordinates and controls various components within data processing system 200 in FIG. 2. The operating system may be a commercially available operating system, such as Microsoft® Windows Vista™. (Microsoft® and Windows Vista are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226. These instructions and may be loaded into main memory 208 for execution by processing unit 206. The processes of the illustrative embodiments may be performed by processing unit 206 using computer implemented instructions, which may be located in a memory. An example of a memory is main memory 208, read only memory 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in interface and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

Illustrative embodiments described herein provide improved systems, methods and computer code products for the filtered display of a system diagram. A user enters a selection of system components to include within a configurable system. An initial top-level system diagram is then generated and displayed to the user. The user can then input a designation specifying one or more logical groups, functional groups, or other specified system components that the user wishes to display as a filtered system diagram. Other system components are examined to determine which, if any, of the system components have attributes matching the designation. A filtered system diagram is then generated highlighting the included system components having attributes matching the designation. Alternatively, the filtered system diagram can exclude those system components not having attributes matching the designation.

The filtered system diagram display in the different illustrative embodiments facilitates better and different views of selected logical and functional groups by eliminating details from the top-level system diagram. The filtered system diagram display provides an easy identification of particular logical and functional groups within an overall system diagram. Utilizing the filtered system diagram display, the physical layout of the selected groups can be better optimized during assembly of the configurable system, by providing engineers and technicians with an easy layout of the particular logical and functional groups. Identification of the various logical and functional groups becomes straightforward.

Figure 3:
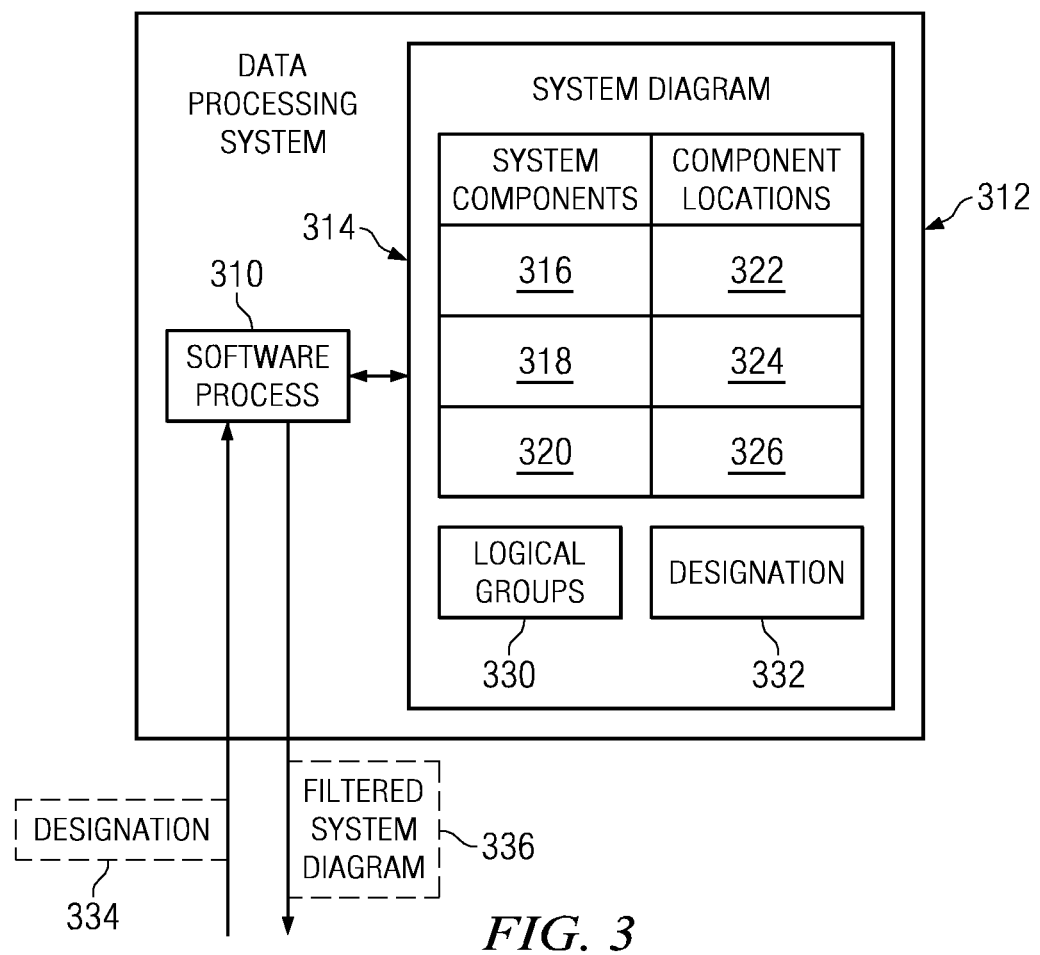
FIG. 3 is a block diagram of a specified event notification process executed on a data processing system in which illustrative embodiments may be implemented.

Referring now to FIG. 3, a block diagram of a specified event notification process executed on a data processing system is shown in which illustrative embodiments may be implemented. Data processing system 312 depicted in FIG. 3 can be data processing system 200 of FIG. 2.

Software process 310 runs on data processing system 312. Software process 310 is capable of receiving user inputs regarding component properties within a system configuration, and displaying filtered system configurations to the user. Software process 310 is used to model system diagram 314. System diagram 314 is a display of a system configuration. System diagram 314 displays all of the physical contents having shape and placement information within the configured system.

System diagram 314 includes system components 316-320 implemented into a number of component locations 322-326. System components 316-320 are any physical contents that occupy a physical space at a defined location within the configured system. As non-limiting example, system components 316-320 can be power devices, such as uninterruptible power supplies and power distribution units. System components 316-320 can be non-volatile storage devices, including read-only memory (ROM), flash memory, hard disk drives, floppy disk drives, magnetic tape, and optical disc drives. System components 316-320 can be any connection facilitating hardware, such as routers, switches, modems, and network adapters. System components 316-320 can also be processing components, such as system processors. Component locations 322-326 represent the available physical locations within the diagramed system, into which system components 316-320 can be placed.

Each system component 316-320 is provided with one or more attributes 328. Attributes 328 are properties of system components 316-320 that facilitate grouping and filtering system components 316-320 into one or more logical groups 330 or functional groups 332. Functional groups 332 are groupings of components based on the components providing similar functions to the system. For example, an exemplary one of functional groups 332 may be a power functional group, identifying each component relating to providing the system with power. In these examples, logical groups 330 are groupings of components based on the components having some processing interrelation. For example, an exemplary one of logical groups 330 may include a processor, a connected storage device, any required connection components, and the power components providing power to the other components in the logical group.

Software process 310 receives designation 334 from a user. Designation 334 specifies one or more logical groups 330 or functional groups 332 that the user wishes to display. Responsive to receiving designation 334, software process 310 compares designation 334 to attributes 328 to determine which, if any, of attributes 328 matches designation 334.

Software process 310 then creates a filtered system diagram 336 for display to the user. Those components 316-320 having attributes 328 matching designation 334 are graphically indicated within the filtered system diagram 336. Graphically indicating a component is causing that component to visually stand out from other components in filtered system diagram 336. Filtered system diagram 336 can graphically indicate components 316-320 having attributes 328 matching designation 334 by including in the filtered system diagram 336 only those system components 316-320 having attributes 328 matching designation 332 entered by the user. Alternatively, filtered system diagram 336 can graphically indicate components 316-320 having attributes 328 matching designation 334 by including all of system components 316-320, and providing highlighted view of ones of system components 316-320 having attributes 328 matching designation 334 entered by the user.

Figure 4:
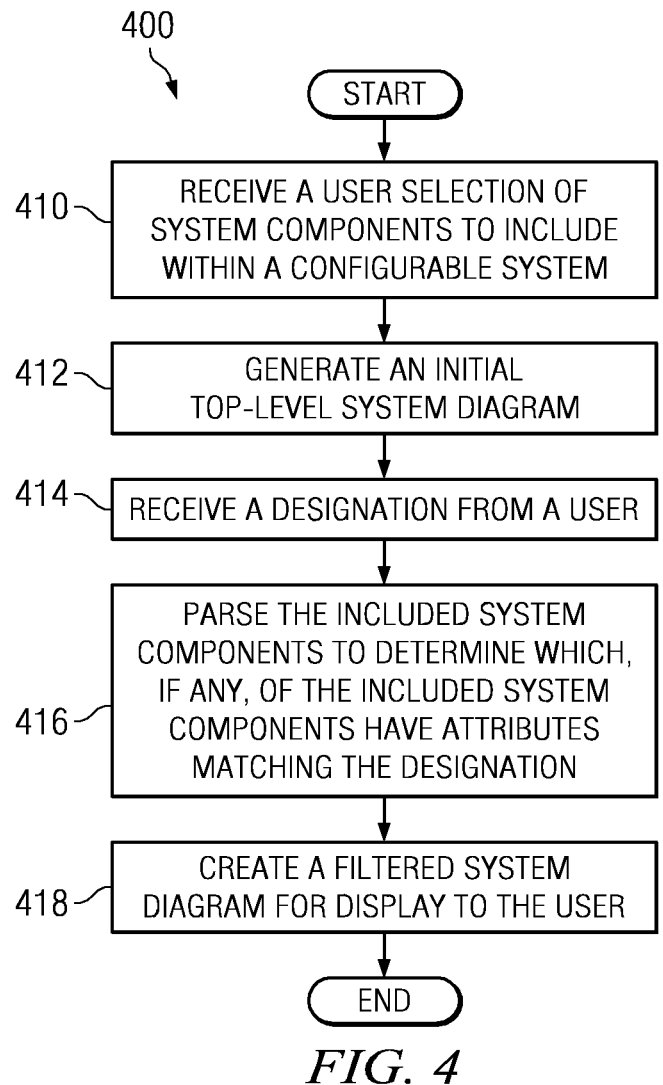
FIG. 4 is a flowchart for a process of configuring a data processing system and displaying a filtered system diagram thereof in which illustrative embodiments may be implemented.

Referring now to FIG. 4, a flowchart of a process of configuring a data processing system and displaying a filtered system diagram is depicted in accordance with an illustrative embodiment. Process 400 is a software process executing in a data processing system, such as software process 310 of FIG. 3, and data processing system 312 of FIG. 3. Process 400 is capable of receiving user inputs regarding component properties within a system configuration, and displaying filtered system configurations to the user.

Process 400 begins by receiving a user selection of system components to include within a configurable system (step 410). The components can be system components 316-320 of FIG. 3. User selection of the system components can include the physical location of the system components within one or more component locations of the configurable system. Component locations can be component locations 322-326 of FIG. 3.

Responsive to receiving system components, and their corresponding component locations, process 400 generates an initial top-level system diagram (step 412). The initial top-level system diagram covers all of the physical contents having shape and placement information within the system. The initial top-level system diagram is shown at the top-level from which a user can access any logical group or individual component of the configurable system. The initial top-level system diagram can be system diagram 314 of FIG. 3.

Once the initial top-level system diagram has been generated, process 400 can receive a designation from a user (step 414). The designation specifies one or more logical groups, functional groups, or other specified system components that the user wishes to display. The designation specifies the one or more logical groups or functional groups by including attributes relating to logical groups or functional groups. The designation can include conventional attributes of the system components, such as part numbers, part descriptions, applicable product implementations, pre-requisites, and co-requisites. The designation can also include new attributes, such as valid view filters, and corresponding functional groups.

In one illustrative embodiment, the designation is selected from a filtered list of valid views. Certain logical groups or functional groups within the system diagram may allow for further filtering of the contents of that group. In one illustrative example, a cabinet within a rack system may have a filtered list of valid views such as "power subsystem," and "processing subsystem." However, the entire system configuration on the rack may have more view filters, such as "CPU-SIU group." The filtered list of valid views represents which views are applicable to the currently viewed filtered system configuration.

Responsive to receiving a designation, process 400 parses the included system components to determine which, if any, of the included system components have attributes matching the designation (step 416).

Responsive to determining which of the included system components have attributes matching the designation, process 400 then creates a filtered system diagram for display to the user (step 418), with the process terminating thereafter. The filtered system diagram is filtered system diagram 336 of FIG. 3. The filtered system diagram graphically indicates within the filtered system diagram those components having attributes matching the designation. The filtered system diagram can graphically indicate those components having attributes matching the designation by including in the filtered system diagram only those system components having attributes matching the designation entered by the user. Alternatively, the filtered system diagram can graphically indicate those components having attributes matching the designation by including all of the system components present in the configurable system, and providing a highlighted view of those system components having attributes matching the designation entered by the user.

Referring now to FIG. 5, a more detailed flowchart is shown for a process of configuring a data processing system and displaying a filtered system diagram thereof in which illustrative embodiments may be implemented. Process 500 is a software process executing in a data processing system, such as software process 310 and data processing system 312 of FIG. 3. Process 500 is capable of receiving user inputs regarding component properties within a system configuration, and displaying filtered system configurations to the user.

Process 500 begins by receiving a user selection of components to be included within a configurable system (step 510). The selection of components can include products, features and other options. The components can include software and hardware components, as well as any desirable properties that the components should possess.

Responsive to receiving the user selection of components, process 500 may run a diagnostic or compatibility check of the various components selected (step 512). The diagnostic and compatibility check ensures that each of the selected components will compatibly operate with one another. Further, the diagnostic or compatibility check may specify additional components or features that should be added to the configurable system. The additional components or features can be those that are required as either a prerequisite or a co-requisite of the selected components.

Process 500 then generates an initial top-level system diagram (step 514). The initial top-level system diagram covers all of the physical contents having shape and placement information within the system. The initial top-level system diagram is shown at the top-level from which a user can access any logical group or individual component of the configurable system. The initial top-level system diagram can be system diagram 314 of FIG. 3.

Process 500 then displays the initial top-level system diagram to the user (step 516). In one illustrative embodiment, the initial top-level system diagram can be displayed as an interactive display, from which the user can select various ones of the selected components, subsequently displaying filtered views thereof. A user can "click," or otherwise select one component from the system diagram, and view one of additional filtered system diagrams that incorporate the selected component.

Responsive to displaying the initial top-level system diagram, process 500 polls for a user entry of a designation (step 518). The designation specifies one or more logical groups, functional groups, or other specified system components that the user wishes to display. The designation specifies the one or more logical groups or functional groups by including attributes relating to logical groups or functional groups. The designation can include conventional attributes of the system components, such as part numbers, part descriptions, applicable product implementations, pre-requisites, and co-requisites. The designation can also include new attributes, such as valid view filters, and corresponding functional groups.

A user entry of a designation (step 518) begins when process 500 detects that the user has selected one of the included components from the system diagram. The user can select the component by "clicking" or "right-clicking" the component within the interactive top-level system diagram to generate a pop-up type or pull-down type menu from the component.

In one illustrative embodiment, the designation is selected from a filtered list of valid views, entered by the user from the interactive top-level system diagram. Certain logical groups or functional groups within the system diagram may allow for further filtering of the contents of that group. In one illustrative example, a cabinet within a rack system may have a filtered list of valid views such as "power subsystem," and "processing subsystem." However, the entire system configuration on the rack may have more view filters, such as "CPU-SIU group." The filtered list of valid views represents which views are applicable to the currently viewed filtered system configuration.

Responsive to beginning the user entry of a designation, process 500 receives a user selection of one of a number of context-based view filters applicable to the selected component from the generated menu (step 520). Applicable view filters may include any functional groups or logical groups corresponding to one or more of the attributes of the selected component. For example, an illustrative view filter may be a power functional group, identifying each component relating to providing the system with power. An illustrative view filter of a selected logical group might include a processor, a connected storage device, any required connection components, and the power components providing power to the other components in the logical group.

Responsive to receiving the user selection of one of a number of context-based view filters (step 522), process 500 determines the attribute associated with the functional groups or logical groups identified by the view filter (step 524). Process 500 then parses each of the remaining selected components to identify and flag each selected component possessing an identical attribute (step 526).

Because certain logical groups or functional groups within the system diagram may allow for further filtering of the contents of that group, certain components nested within one of these logical groups or functional groups will have ancestor containers. An ancestor container is a parent or other linear relative from which the currently selected logical group or functional group depends. It may therefore be helpful to know these ancestor containers, and their physical locations within the configurable system. Therefore, process 500 identifies any ancestor containers of the selected component (step 528).

Process 500 then generates and displays a filtered system diagram to the user based on the user's selection of the context-based view filter (step 530), with the process terminating thereafter. The filtered system diagram is filtered system diagram 336 of FIG. 3. The filtered system diagram graphically indicates within the filtered system diagram those components having attributes matching the designation. The filtered system diagram can graphically indicate those components having attributes matching the designation by including in the filtered system diagram only those system components having attributes matching the designation entered by the user. Alternatively, the filtered system diagram can graphically indicate those components having attributes matching the designation by including all of the system components present in the configurable system, and providing a highlighted view of those system components having attributes matching the designation entered by the user.

Figure 6A:
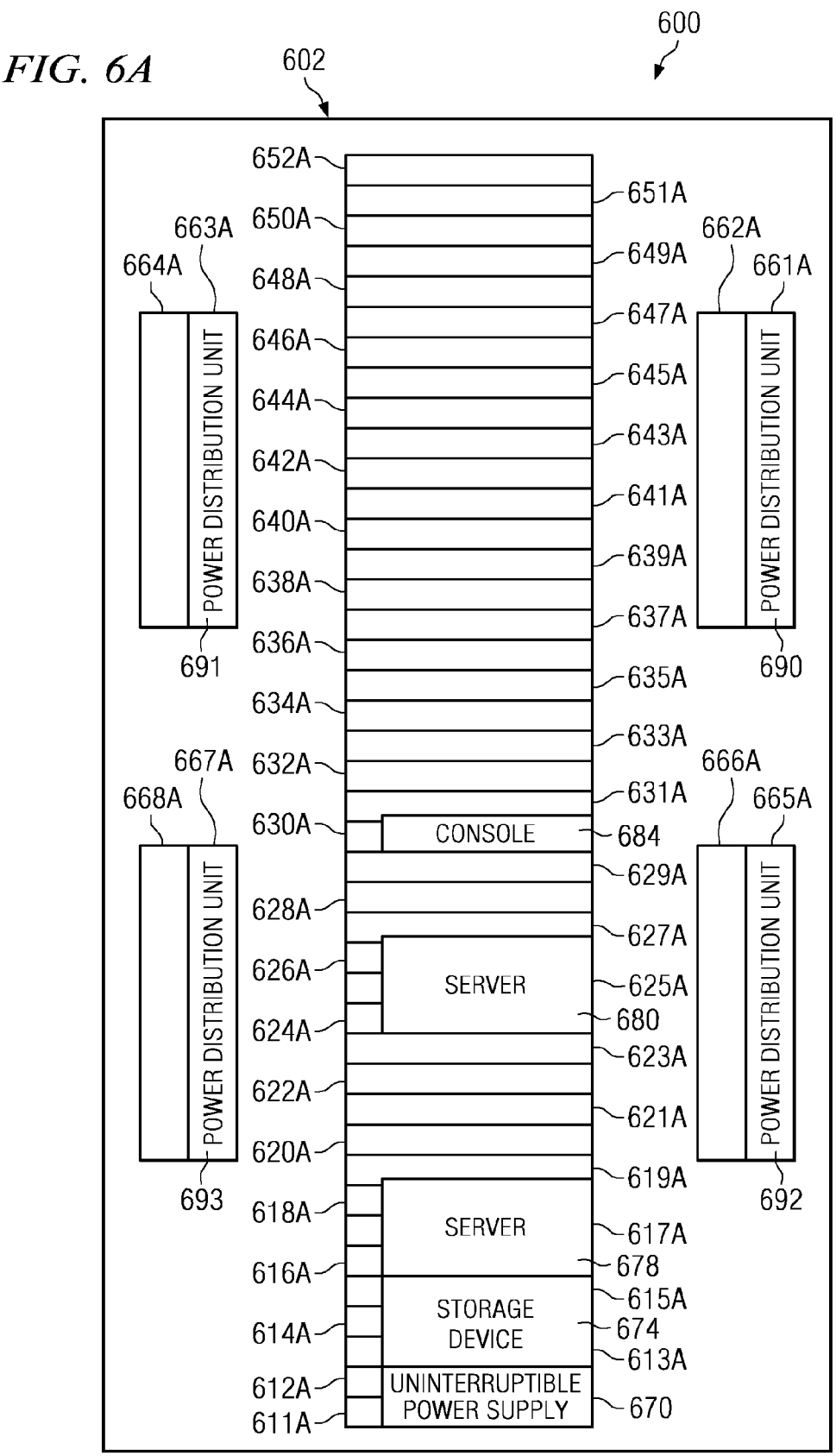
FIGS. 6A and 6B is an overall system diagram of a typical system configuration in which illustrative embodiments may be implemented.
Figure 6B:
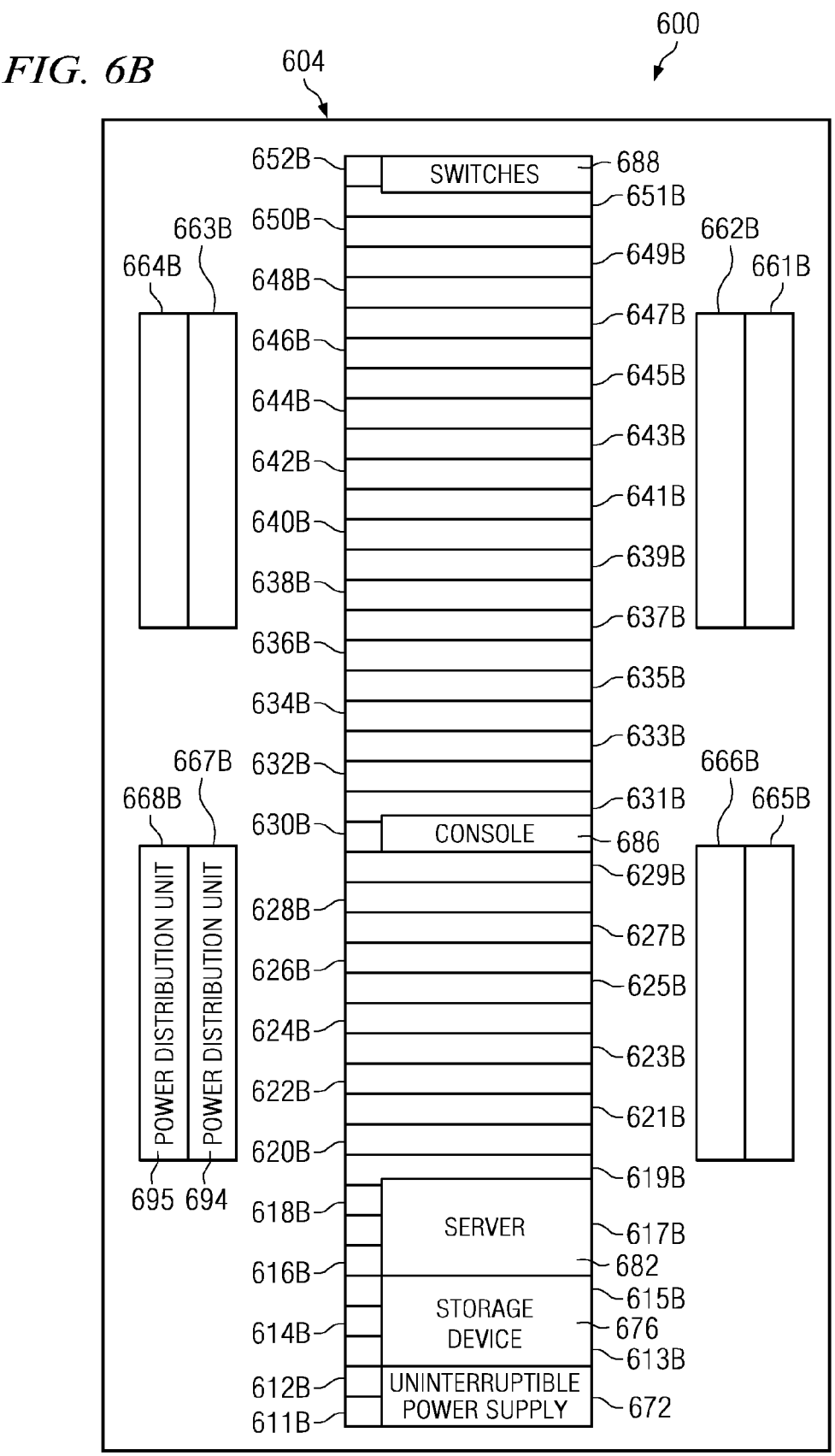

Referring now to FIGS. 6A and 6B, an overall system diagram of a typical system configuration is shown in which illustrative embodiments may be implemented. System diagram 600 covers all of the physical contents having shape and placement information within the system. System diagram 600 is shown at the top-level from which a user can access any logical group or individual component of system 600. Specific components, and the configuration thereof, shown in the system diagram of FIGS. 6A and 6B are not limited to the illustrative embodiments. System diagram 600 can be system diagram 314 of FIG. 3.

System diagram 600 is a typical 2 rack system, including rack A 602, and rack B 604. Rack A 602 is provided with a plurality of component locations 611A-652A. Similarly, rack B 604 is provided with a plurality of component locations 611B-652B. Each of racks A 602 and B 604 are also provided with a plurality of power distribution unit locations 661A-668A and 661B-668B, respectively. The physical dimensions of various components that can occupy the plurality of component locations 611A-652A and 611B-652B, and the plurality of power distribution unit locations 661A-668A and 661B-668B, may be such that a single component can occupy more than one location.

Rack A 602 is provided with a number of components. Uninterruptible power supplies 670 and 672 occupy component locations 611A-612A and 611B-612B, respectively. Uninterruptible power supplies 670 and 672 can be battery backup or surge protection devices maintaining a continuous supply of electric power to racks A 602 and B 604, respectively, when utility power to racks A 602 and B 604 is altered, either through an electrical surge or electrical outage.

Storage devices 674 and 676 occupy component locations 613A-615A and 613B-615B, respectively. Storage devices 674 and 676 can be any non-volatile storage devices, including read-only memory (ROM), flash memory, hard disk drives, floppy disk drives, magnetic tape, and optical disc drives.

Servers 678, 680, and 682 occupy component locations 616A-618A, 624A-626A, and 616B-618B, respectively. As used herein, a server is a data processing system that has been designated for running a specific server application or applications. The server may be intended for use running server applications, often under heavy workloads, unattended, for extended time.

Consoles 684 and 686 occupy component locations 630A and 630B, respectively. Consoles 684 and 686 are text entry and display devices for system administration messages. Consoles 684 and 686 may be console ports that allow a system engineer or operator connect a terminal computer to any of the attached servers.

Switches 688 occupy component location 652B. Switches 688 direct data to various applications within, and external to rack A 602, and rack B 604.

Power distribution units 690-695 are located in power distribution unit locations 661A, 663A, 665A, 667A, 667B, and 668B, respectively. Power distribution units 690-695 distribute electric power throughout the various components of rack A 602, and rack B 604.

Figure 7B:
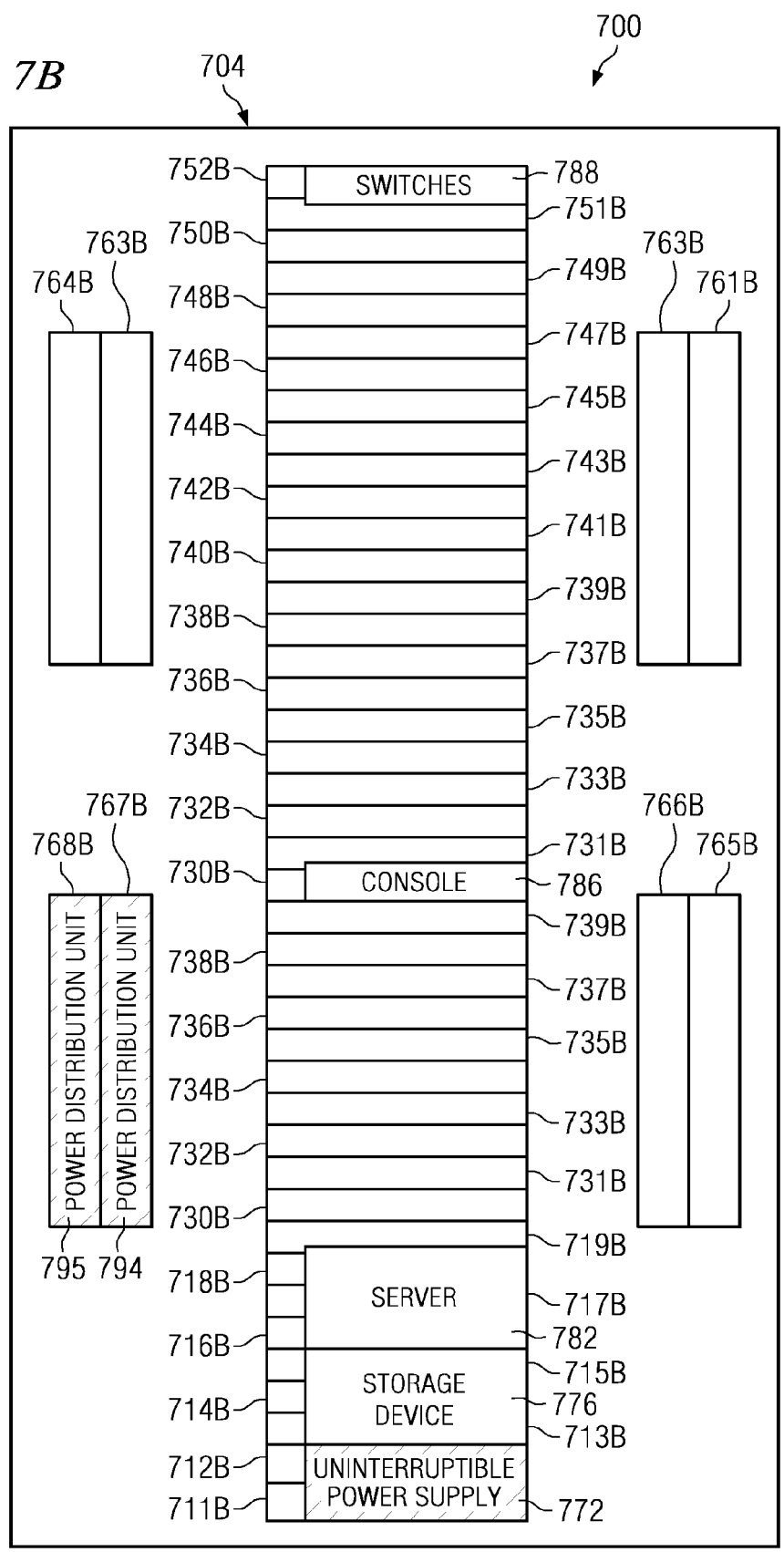

Referring now to FIGS. 7A and 7B, the system diagram of FIG. 6 is shown displaying highlighted power subsystem components according to the illustrative embodiments. System diagram 700 highlights only those components having shape and placement information within the system that have been designated as part of the power subsystem. System diagram 700 highlights components that are included in the selected power subsystem as highlighted components. The selected power subsystem is highlighted in response to a user designation of the power subsystem. System diagram 700 can be filtered system diagram 336 of FIG. 3.

Uninterruptible power supplies 770 and 772 are uninterruptible power supplies 670 and 672 of FIG. 6. Power distribution units 790-795 are power distribution units 690-695 of FIG. 6. Uninterruptible power supplies 770-772 and power distribution units 790-795 are highlighted as being part of the selected power subsystem. An engineer or other personnel viewing a display of FIG. 7 can immediately determine the location of any component designated as part of the selected power subsystem.

Figure 8A:
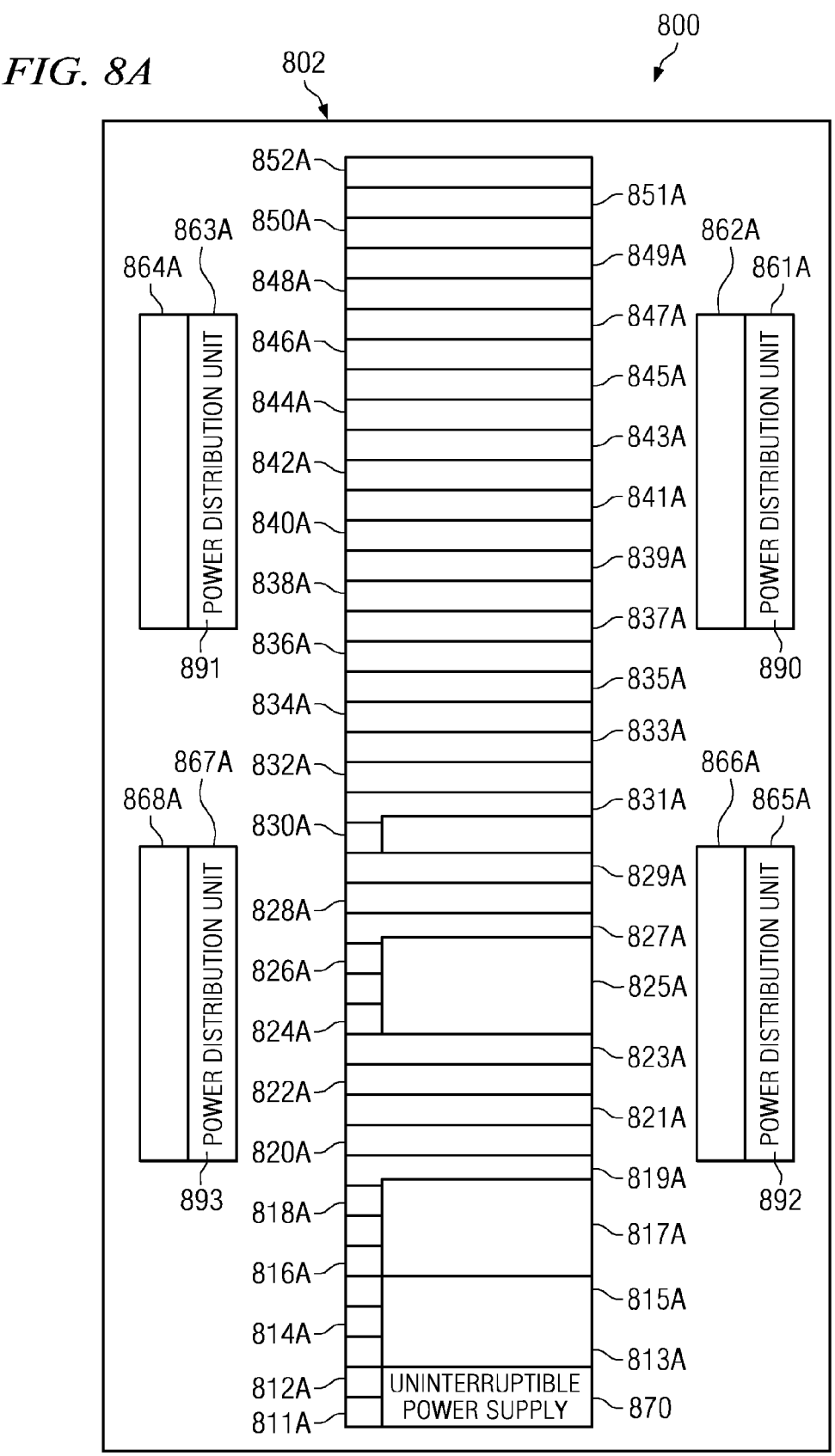
FIGS. 8A and 8B is the system diagram of FIG. 6 shown filtered to display only power subsystem components in which illustrative embodiments may be implemented.
Figure 8B:
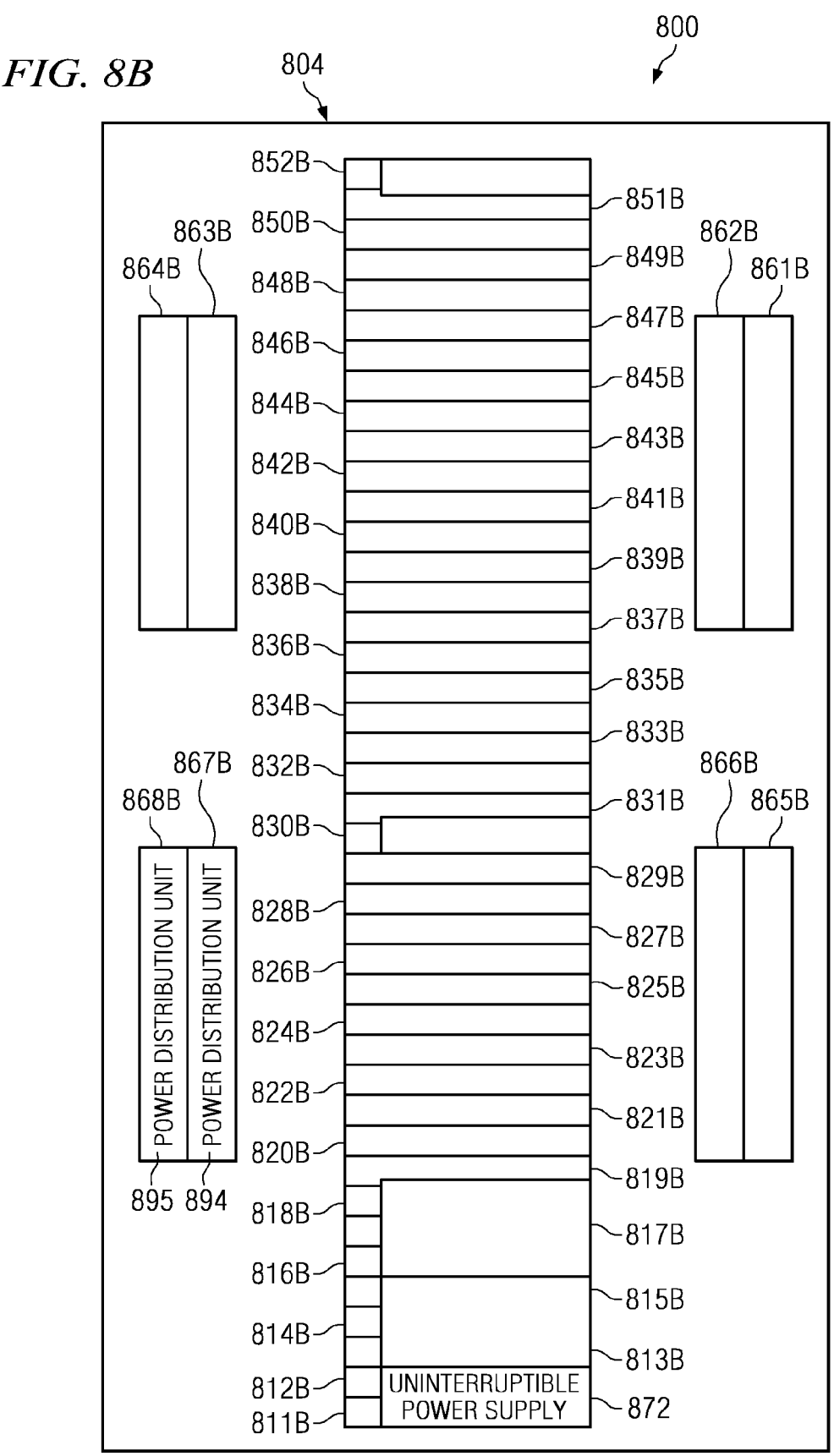

Referring now to FIGS. 8A and 8B, the system diagram of FIG. 6 is shown filtered to display only power subsystem components in which illustrative embodiments may be implemented. System diagram 800 displays only those components having shape and placement information within the system that have been designated as part of the power subsystem. System diagram 800 displays components that are included in the selected power subsystem as highlighted components. The selected power subsystem is highlighted in response to a user designation of the power subsystem. System diagram 800 can be filtered system diagram 336 of FIG. 3.

Uninterruptible power supplies 870 and 872 are uninterruptible power supplies 670 and 672 of FIG. 6. Power distribution units 890-895 are power distribution units 690-695 of FIG. 6. Uninterruptible power supplies 870-872 and power distribution units 890-895 are displayed as being part of the selected power subsystem. Storage devices 674-676, servers 678-682, consoles 684-686, and switches 688 included in system diagram 600 of FIG. 6 are not shown in system diagram 800. The excluded components are not designated as part of the selected power subsystem. An engineer or other personnel viewing a display of FIG. 8 can immediately determine the location of any component designated as part of the selected power subsystem.

Figure 9A:
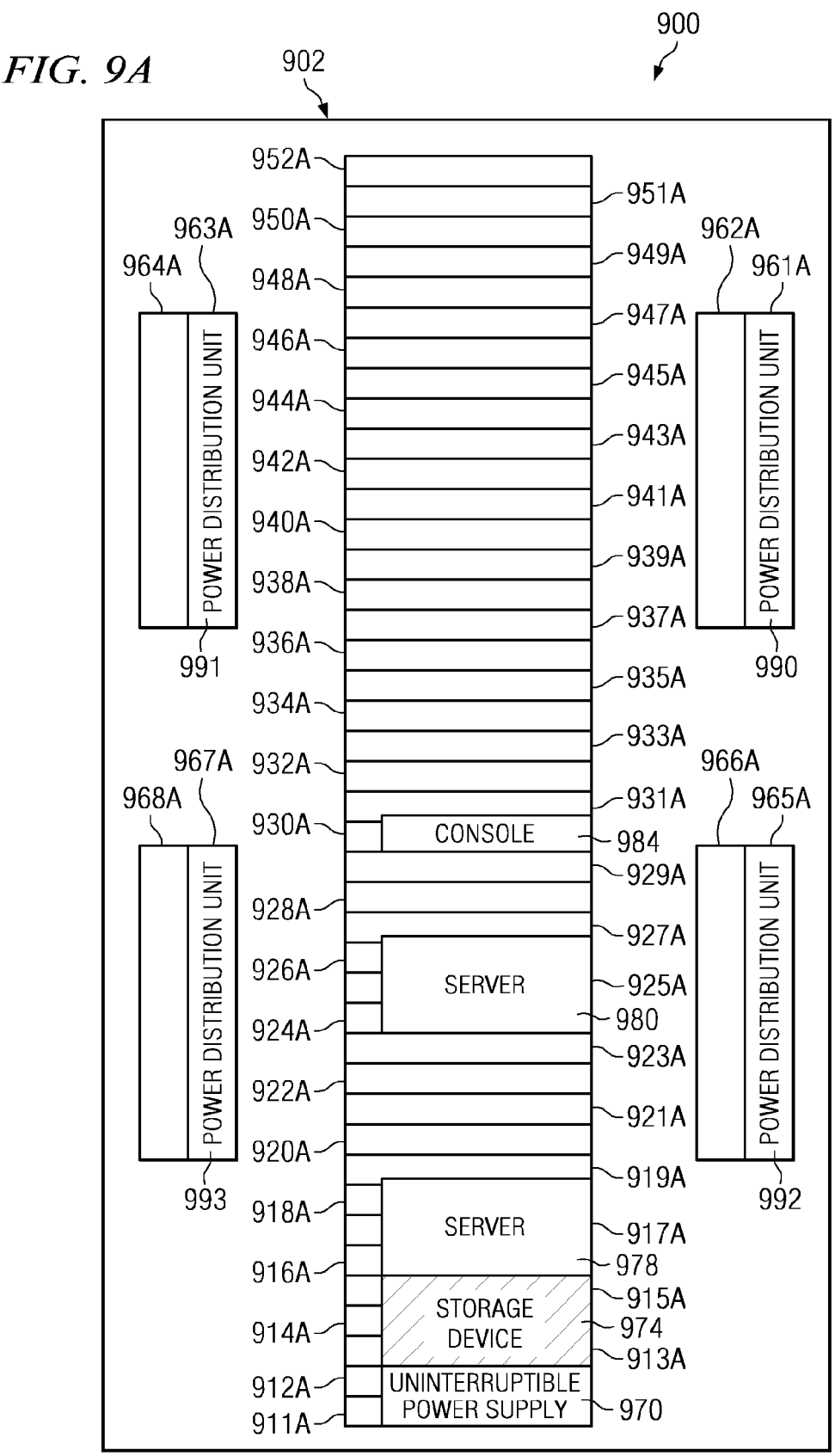

Referring now to FIGS. 9A and 9B, the system diagram of FIG. 6 is shown displaying highlighted storage subsystem components in which illustrative embodiments may be implemented. System diagram 900 highlights only those components having shape and placement information within the system that have been designated as part of the storage subsystem. System diagram 900 highlights components that are included in the selected storage subsystem as highlighted components. The selected storage subsystem is highlighted in response to a user designation of the storage subsystem. System diagram 900 can be filtered system diagram 336 of FIG. 3.

Storage devices 974 and 976 are storage devices 674 and 676 of FIG. 6. Storage devices 974 and 976 are highlighted as being part of the selected storage subsystem. An engineer or other personnel viewing a display of FIG. 9 can immediately determine the location of any component designated as part of the selected storage subsystem.

Figure 10A:
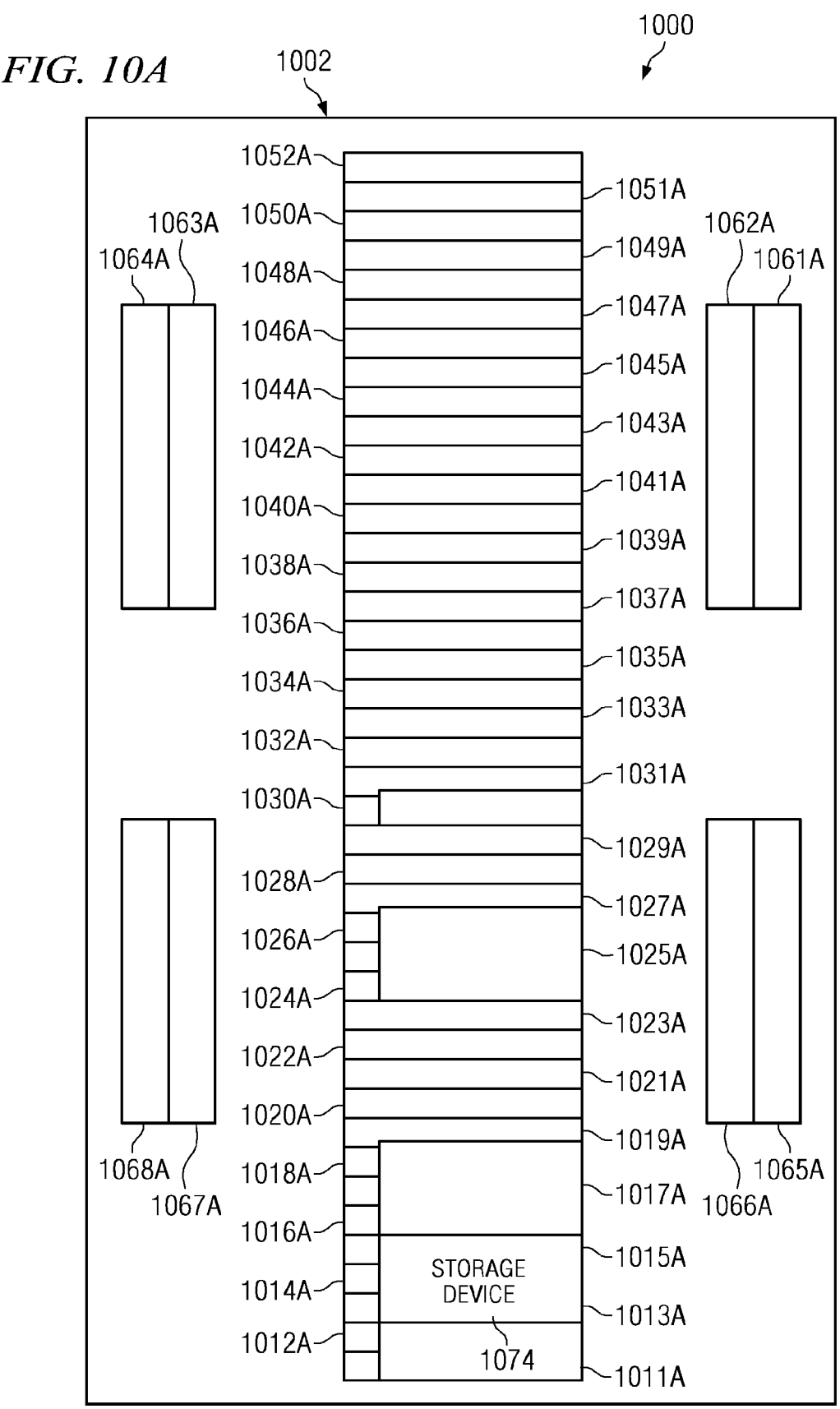
FIGS. 10A and 10B is the system diagram of FIG. 6 shown filtered to display only storage subsystem components in which illustrative embodiments may be implemented.
Figure 10B:
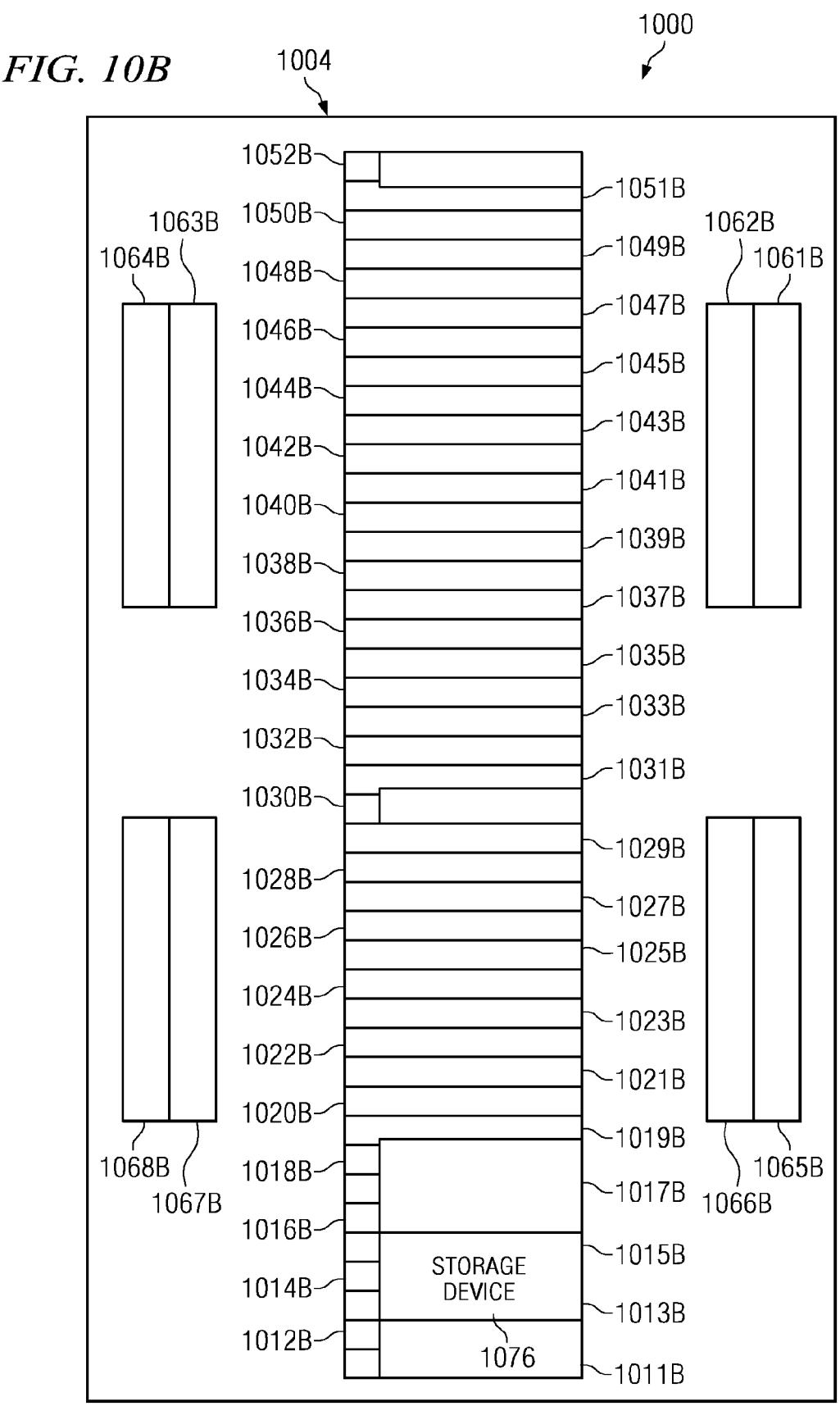

Referring now to FIGS. 10A and 10B, the system diagram of FIG. 6 is shown filtered to display only storage subsystem components in which illustrative embodiments may be implemented. System diagram 1000 displays only those components having shape and placement information within the system that have been designated as part of the storage subsystem. System diagram 1000 displays components that are included in the selected storage subsystem as highlighted components. The selected storage subsystem is highlighted in response to a user designation of the storage subsystem. System diagram 1000 can be filtered system diagram 336 of FIG. 3.

Storage devices storage 1074 and 1076 are storage devices 674 and 676 of FIG. 6. Storage devices 1074 and 1076 are displayed as being part of the selected storage subsystem. Uninterruptible power supplies 670-672, power distribution units 690-695, servers 678-682, consoles 684-686, and switches 688 included in system diagram 600 of FIG. 6 are not shown in system diagram 1000. The excluded components are not designated as part of the selected storage subsystem. An engineer or other personnel viewing a display of FIG. 10 can immediately determine the location of any component designated as part of the selected storage subsystem.

Thus, the illustrative embodiments described herein provide improved systems, methods and computer code products for the filtered display of a system diagram. A user enters a selection of system components to be included within a configurable system. An initial top-level system diagram is then generated and displayed to the user. The user can then input a designation specifying one or more logical groups, functional groups, or other specified system components that the user wishes to display as a filtered system diagram. Other system components are examined to determine which, if any, of the system components have attributes matching the designation. A filtered system diagram is then generated highlighting the included system components having attributes matching the designation. Alternatively, the filtered system diagram can exclude those system components not having attributes matching the designation.

The filtered system diagram in the different illustrative examples display facilitates a use of different views of selected logical and functional groups by eliminating details from the top-level system diagram. The filtered system diagram display in these examples provides an easy identification of particular logical and functional groups within an overall system diagram. Utilizing the filtered system diagram display, the physical layout of the selected groups can be better optimized during assembly of the configurable system, by providing engineers and technicians with an easy layout of the particular logical and functional groups. Identification of the various logical and functional groups becomes straightforward.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for selectively viewing filtered system diagrams of a configurable system, the method comprising:

in response to receiving a user selection of system components to include within the configurable system, displaying an initial top-level system diagram showing physical locations of physical components within the configurable system, the system diagram comprising a first component corresponding to a first physical component of the physical components within the configurable system, the first component having a first attribute, and a second component corresponding to a second physical component of the physical components within the configurable system, the second component having a second attribute, wherein each of the physical components of the system is defined in a configuration model comprising logic defining a logical grouping representative of one or more of the physical components, wherein the logical grouping, is or is not selectively, a physical group of components and wherein an attribute associated with one or more components identifies the one or more components to enable grouping;

receiving a designation specifying the first attribute, wherein the designation specifies one or more logical groups or functional groups to display including attributes comprising normal attributes and new attributes, the new attributes further comprising a valid view filter attribute and a corresponding functional group attribute;

selecting a group of the physical components associated with the one or more logical groups or functional groups using the designation to form a selected group;

displaying the selected group using a filtered system diagram, wherein a physical location of the first component within the configurable system is graphically indicated within the filtered system diagram using physical context information associated with the components to visually distinguish the selected group from other system components;

responsive to receiving the designation specifying the first attribute, identifying whether the second attribute is identical to the first attribute;

responsive to identifying that the second attribute is identical to the first attribute, displaying the selected group using the filtered system diagram, wherein a physical location of the second component within the configurable system is also graphically indicated within the filtered system diagram; and responsive to identifying the second attribute is not identical to the first attribute, displaying the selected group using the filtered system diagram, wherein the filtered system diagram does not graphically indicate the physical location of the second component within the system.

2. The computer implemented method of claim 1, wherein selecting a group of the physical components using the designation further comprises:

obtaining an attribute associated with a logical group or a functional group as identified by a selected one of context-based view filters; and parsing remaining components to flag each selected component having an identical attribute.

3. The computer implemented method of claim 2, wherein the not graphically indicating the second component comprises one of excluding the second component from the filtered system diagram and graying out the second component in the filtered system diagram.

4. The computer implemented method of claim 1, wherein the graphically indicating the first component and graphically indicating the second component comprise highlighting both the first component and the second component within the filtered system diagram.

5. The computer implemented method of claim 1, wherein the first attribute is representative of a first logical group or a first functional group and wherein filtering of contents of the group, further identifies particular components, nested within one of the logical group or functional group, which have ancestor containers.

6. The computer implemented method of claim 1, wherein the receiving a designation specifying the first attribute further comprises:
    selecting a component from an interactive display of the filtered system diagram; and
    wherein displaying the selected group using a filtered system diagram further comprises generating for display a filtered system diagram according to a user selected context-based view filter.

7. The computer implemented method of claim 1, wherein the first physical component and the second physical component are selected from the group consisting of an uninterruptible power supply, a power distribution unit, a read-only memory, a hard disk drive, a floppy disk drive, a magnetic tape drive, an optical disk drive, a routers, a switch, a modem, a network adapter, and a system processor.

8. A computer program product comprising:
    a non-transitory computer readable medium having computer usable program code for selectively viewing filtered system diagrams of a configurable system, the computer program product comprising:
    computer usable program code in response to receiving a user selection of system components to include within the configurable system for displaying an initial top-level system diagram showing physical locations of physical components within the configurable system, the system diagram comprising a first component corresponding to a first physical component of the physical components within the system, the first component having a first attribute, and a second component corresponding to a second physical component of the physical components within configurable system, the second component having a second attribute, wherein each of the physical components of the system is defined in a first configuration model comprising logic defining a logical grouping representative of one or more of the physical components, wherein the logical grouping is not necessarily a physical group of components and wherein an attribute associated with one or more components identifies the one or more components to enable grouping;
    computer usable program code for receiving a designation specifying the first attribute, wherein the designation specifies one or more logical groups or functional groups to display including attributes comprising normal attributes and new attributes, the new attributes further comprising a valid view filter attribute and a corresponding functional group attribute;
    computer usable program code for selecting a group of the physical components associated with the one or more logical groups or functional groups using the designation to form a selected group;
    computer usable program code for displaying the selected group using a filtered system diagram to the user, wherein a physical location of the first component within the configurable system is graphically indicated within the filtered system diagram using physical context information associated with the components to visually distinguish the selected group from other system components;
    computer usable program code responsive to receiving the designation specifying the first attribute, for identifying whether the second attribute is identical to the first attribute;
    computer usable program code responsive to identifying that the second attribute is identical to the first attribute, for displaying the selected group using the filtered system diagram, wherein a physical location of the second component within the configurable system is also graphically indicated within the filtered system diagram; and
    computer usable program code responsive to identifying the second attribute is not identical to the first attribute, for displaying the selected group using the filtered system diagram, wherein the filtered system diagram does not graphically indicate the physical location of the second component within the system.

9. The computer program product of claim 8, wherein computer usable program code for selecting a group of the physical components using the designation further comprises:
    computer usable program code for obtaining an attribute associated with a logical group or a functional group as identified by a selected one of context-based view filters; and
    computer usable program code for, parsing remaining components to flag a selected component having an identical attribute.

10. The computer program product of claim 9, wherein the computer usable program code for not graphically indicating the second component further comprises computer usable program code for one of excluding the second component from the filtered system diagram and graying out the second component in the filtered system diagram.

11. The computer program product of claim 8, wherein the computer usable program code for graphically indicating the first component and graphically indicating the second component further comprises computer usable program code for highlighting both the first component and the second component within the filtered system diagram.

12. The computer program product of claim 8, wherein the first attribute is representative of a first logical group or a first functional group and wherein computer usable program code for filtering of contents of the group, further identifies particular components nested within one of the logical group or functional group which have ancestor containers.

13. The computer program product of claim 12, wherein the computer usable program code for receiving a designation specifying the first attribute further comprises:
    wherein computer usable program code for selecting a component from an interactive display of the filtered system diagram; and
    wherein the computer usable program code for displaying the selected group using a filtered system diagram further comprises computer usable program code for generating for display a filtered system diagram according to a user selected context-based view filter.

14. The computer program product of claim 8, wherein the first physical component and the second physical component are selected from the group consisting of an uninterruptible power supply, a power distribution unit, a read-only memory, a hard disk drive, a floppy disk drive, a magnetic tape drive, an optical disk drive, a routers, a switch, a modem, a network adapter, and a system processor.

15. A data processing system comprising:
a bus;
a storage device connected to the bus, wherein the storage device includes computer usable program code; and
a processor unit connected to the bus, wherein the processor executes the computer usable program code in response to receiving a user selection of system components to include within a configurable system to display an initial top-level system diagram showing physical locations of physical components within the configurable system, the system diagram comprising a first component corresponding to a first physical component of the physical components within the configurable system, the first component having a first attribute, and a second component corresponding to a second physical component of the physical components within configurable system, the second component having a second attribute, wherein each of the physical components of the system is defined in a configuration model comprising logic defining a logical grouping representative of one or more of the physical components, wherein the logical grouping is not necessarily a physical group of components and wherein an attribute associated with one or more components identifies the one or more components to enable grouping; to receive a designation specifying the first attribute, wherein the designation specifies one or more logical groups or functional groups to display including attributes comprising normal attributes and new attributes, the new attributes further comprising a valid view filter attribute and a corresponding functional group attribute; to select a group of the physical components associated with the one or more logical groups or functional groups using the designation to form a selected group and to display the selected group using a filtered system diagram to the user, wherein a physical location of the first component within the configurable system is graphically indicated within the filtered system diagram using physical context information associated with the components to visually distinguish the selected group from other system components and wherein responsive to receiving the designation specifying the first attribute, identify whether the second attribute is identical to the first attribute; responsive to identifying that the second attribute is identical to the first attribute, display the selected group using the filtered system diagram, wherein a physical location of the second component within the configurable system is also graphically indicated within the filtered system diagram; and responsive to identifying the second attribute is not identical to the first attribute, display the selected group using the filtered system diagram, wherein the filtered system diagram does not graphically indicate the physical location of the second component within the system.

16. The data processing system of claim 15, wherein the computer usable program code for graphically indicating the first component and graphically indicating the second component comprises highlighting both the physical location of the first component within the configurable system and the physical location of the second component within the configurable system within the filtered system diagram.

17. The data processing system of claim 15, wherein the computer usable program code for not graphically indicating the second component comprises one of excluding the second component from the filtered system diagram and graying out the second component in the filtered system diagram.

18. The data processing system of claim 15, wherein the first physical component and the second physical component are selected from the group consisting of an uninterruptible power supply, a power distribution unit, a read-only memory, a hard disk drive, a floppy disk drive, a magnetic tape drive, an optical disk drive, a routers, a switch, a modem, a network adapter, and a system processor.

* * * * *